United States Patent
Lee et al.

(10) Patent No.: US 8,576,798 B2
(45) Date of Patent: Nov. 5, 2013

(54) DATA COMMUNICATION APPARATUS AND DATA COMMUNICATION METHOD THEREOF

(75) Inventors: Cheon-moo Lee, Gyeonggi-do (KR); Il-han Lee, Gyeonggi-do (KR); Soo-hyun Yoo, Incheon (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 309 days.

(21) Appl. No.: 12/860,148

(22) Filed: Aug. 20, 2010

(65) Prior Publication Data

US 2011/0096850 A1 Apr. 28, 2011

(30) Foreign Application Priority Data

Oct. 22, 2009 (KR) .................. 10-2009-0100808

(51) Int. Cl.
*H04W 4/00* (2009.01)
*H04W 36/00* (2009.01)
*H04J 3/26* (2006.01)
*G06F 15/16* (2006.01)

(52) U.S. Cl.
USPC ........ 370/331; 370/338; 370/395.2; 370/432; 455/436; 709/227

(58) Field of Classification Search
USPC ......... 370/218, 221–228, 230, 250, 252, 346, 370/352–353, 445, 447, 461–462, 477; 375/240–240.02, 267, 299, 346–349; 455/432.1–464; 709/227–244
See application file for complete search history.

(56) References Cited

U.S. PATENT DOCUMENTS

| | | | |
|---|---|---|---|
| 6,400,964 B1 * | 6/2002 | Zicker et al. | 455/553.1 |
| 7,917,146 B2 * | 3/2011 | Calhoun et al. | 455/436 |
| 8,103,269 B2 * | 1/2012 | Choi | 455/426.1 |
| 8,265,032 B2 * | 9/2012 | Cantenot et al. | 370/331 |
| 8,270,331 B2 * | 9/2012 | Kim et al. | 370/312 |
| 8,284,744 B2 * | 10/2012 | Mukai et al. | 370/338 |
| 2008/0112356 A1 * | 5/2008 | Jung et al. | 370/328 |
| 2008/0304458 A1 * | 12/2008 | Aghvami et al. | 370/338 |
| 2009/0010181 A1 * | 1/2009 | Yang et al. | 370/254 |
| 2009/0111510 A1 * | 4/2009 | Ono | 455/552.1 |
| 2011/0090790 A1 * | 4/2011 | Bergqvist et al. | 370/230 |
| 2011/0281543 A1 * | 11/2011 | White et al. | 455/337 |

* cited by examiner

*Primary Examiner* — Tri H Phan
(74) *Attorney, Agent, or Firm* — Cha & Reiter, LLC

(57) ABSTRACT

A data communication apparatus and method that permits communication between two devices without having to perform a complicated initial connection procedure. A communication unit conducts data transmission/reception with an external data communication apparatus, and a controller controls the communication unit to operate in one of a network mode or a broadcast mode. The network mode conducts network communication via connection through an initial connection procedure with the external data communication apparatus and the broadcast mode receives or transmits data to/from the external data communication apparatus according to a predetermined broadcast method.

20 Claims, 7 Drawing Sheets

NETWORK MODE

BROADCAST MODE

DATA COMMUNICATION APPARATUS AND DATA COMMUNICATION METHOD THEREOF

CLAIM OF PRIORITY

This application claims priority from Korean Patent Application No. 10-2009-0100808, filed on Oct. 22, 2009 in the Korean Patent Office, the disclosure of which is incorporated herein by reference in its entirety.

BACKGROUND OF THE INVENTION

1. Field of the Invention

The present invention relates to a data communication apparatus and a data communication method thereof. More particularly, the present invention relates to a data communication apparatus having a network communication function for an initial connection process (procedure) to send and receive data, and a data communication method thereof.

2. Description of the Related Art

A data communication apparatus such as a PC, a mobile phone, etc. sends and receives a data to and from a counterpart data communication apparatus (hereinafter, referred to as an "external data communication apparatus) according to a particular communication method.

A traditional data communication apparatus employs a network communication method e.g., wireless LAN and Bluetooth in order to send and receive data.

However, a conventional data communication apparatus having a network communication function is required to perform an initial connection procedure that is a mutual connection setting process ("pairing" in the case of Bluetooth) in order to send and receive a data to and from an external data communication apparatus in the network communication method.

However, the initial connection procedure in the network communication method involves a performance of a complicated operation that takes a considerable amount of time, thereby inconveniencing a user. In particular, if data is transmitted to several external data communication apparatuses, additional time is necessary in proportion to the increased number of external data communication apparatuses.

Further, in the case of transmitting a small amount of data in a single event, it is not efficient to carry out the initial connection procedure according to the current process.

In addition, once the initial connection procedure is performed, a reconnection is possible whenever an external data communication apparatus needs to communicate again with the same device. Accordingly, even though an unknown user, who does not have any right to access the information stored in the data communication apparatus, can utilize the external data communication apparatus, there is a problem in that the information can be stolen.

SUMMARY OF THE INVENTION

Accordingly, one or more exemplary embodiments of the present invention provide a data communication apparatus that sends and receives data in a simple method without having to perform an initial connection procedure, thereby improving the ease of use. The presently claimed invention provides a data communication thereof for efficient transmission of the data and minimizes a possible leak of information.

The foregoing and/or other exemplary aspects of the present invention may be achieved by providing a data communication apparatus that preferably includes a communication unit for conducting data transmission/reception with an external data communication apparatus; and a controller for controlling the communication unit to operate in one of a network mode of conducting network communication via connection through an initial connection process with the external data communication apparatus and a broadcast mode of receiving and/or transmitting data to or from the external data communication apparatus according to a predetermined broadcast method.

The data communication apparatus according to the present invention may also further include a user input unit receiving input from a user, wherein the controller may control the communication unit to operate in the one of the network mode and the broadcast mode determined by the input from the user.

The communication unit may transmit mode information indicating which of the network mode and the broadcast mode to the external data communication apparatus.

The communication unit may operate in the one of the network mode and the broadcast mode determined on the basis of mode information transmitted from the external data communication apparatus.

The data communication apparatus according to the present invention may also further include a notification part, wherein the controller may control the notification part to inform a user that data is transmitted from the external data communication apparatus in the broadcast mode.

The data communication apparatus according to the present invention may also further include a user input unit receiving input from a user, wherein the controller directs the communication unit to transmit a file selected by the user, in the broadcast mode to the external data communication apparatus.

The data communication apparatus according to the present invention may also further include a display unit, wherein the controller may display on the display unit a status indicating which of the network mode and the broadcast mode is determined.

The foregoing and/or other exemplary aspects of the present invention may be also achieved by providing a data communication method of a data communication apparatus including: determining one of a network mode and a broadcast mode; and conducting network communication via connection through an initial connection procedure with an external data communication apparatus if the network mode is determined, and transmitting or receiving data to or from the external data communication apparatus according to a predetermined broadcast method if the broadcast mode is determined.

The data communication method according to the present invention may also further include receiving input from a user, wherein the determining one of a network mode and a broadcast mode may include determining the one of the network mode and the broadcast mode according to the input from the user.

The transmitting of the data according to the present invention may also include transmitting mode information indicating which of the network mode and the broadcast mode is the present mode of the external data communication apparatus.

The determining may also include determining the one of the network mode and the broadcast mode on the basis of the mode information transmitted from the external data communication apparatus.

The data communication method according to the present invention may further include the action of informing a user that data is transmitted from the external data communication apparatus in the broadcast mode.

The data communication method according to the present invention may further include receiving input from a user; and selecting a file to be transmitted in the broadcast mode according to the input from the user, wherein the transmitting of the data may include transmitting the selected file.

The data communication method according to the present invention may further include displaying on a display unit a status indicating which of the network mode and the broadcast mode is determined.

BRIEF DESCRIPTION OF THE DRAWINGS

The above and/or other exemplary aspects according to the present invention will become apparent and more readily appreciated from the following description of the exemplary embodiments, taken in conjunction with the accompanying drawings, in which.

DETAILED DESCRIPTION

Figure 1:
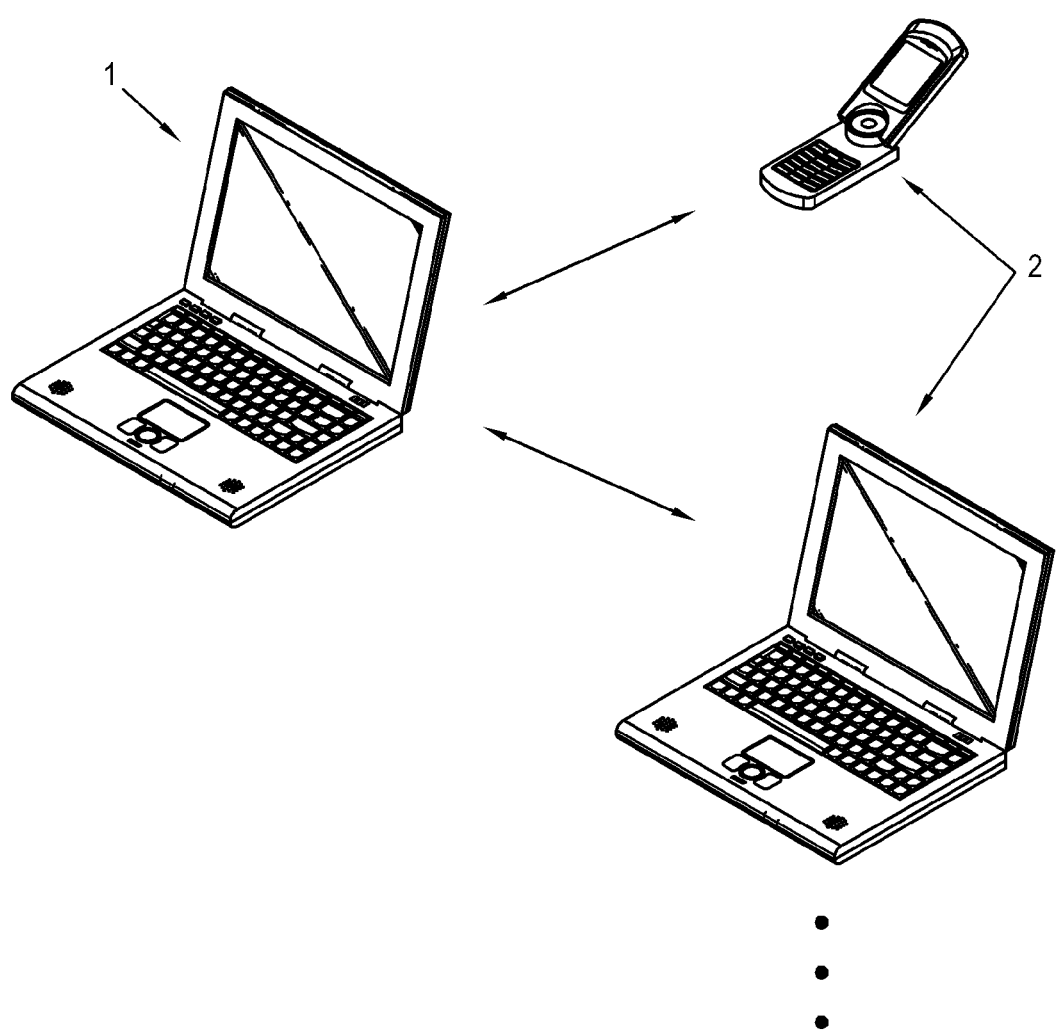
FIG. 1 illustrates a data communication apparatus according to one exemplary embodiment of the present invention.

Below, exemplary embodiments of the present invention will now be described in detail with reference to accompanying drawings so as to be easily realized by a person having ordinary knowledge in the art. The exemplary embodiments of the present invention may be realized in various forms without being limited to the exemplary embodiments set forth herein and recited in the appended claims. Descriptions of well-known parts and constructions may be omitted so as not to obscure appreciation of the claimed invention by a person of ordinary skill in the art, and like reference numerals refer to like elements throughout.

FIG. 1 shows a data communication apparatus 1 according to an exemplary embodiment of the present invention. The data communication apparatus 1 shown in FIG. 1 may be, for example, a PC, netbook, notepad, tablet e.g., a laptop having a communication function. Alternatively, the data communication apparatus 1 may be realized as a variety of devices, e.g., a mobile phone with a communication function. The data communication apparatus 1 communicates with its counterpart, i.e., an external data communication apparatus 2. In the present exemplary embodiment, the external data communication apparatus 2 may also be a PC, a mobile phone, etc., just to name a few possibilities.

Figure 2:
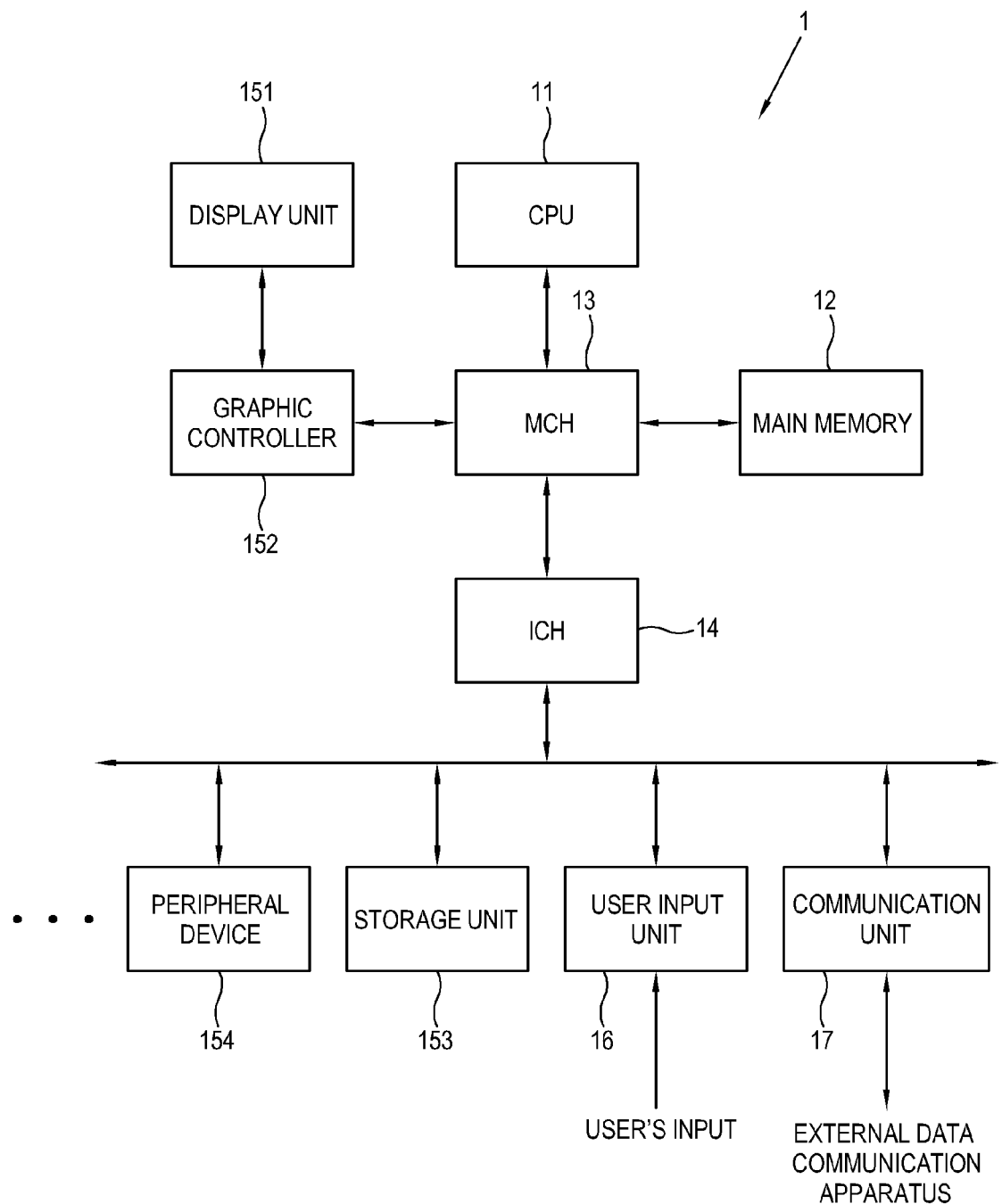
FIG. 2 is a block diagram illustrating a configuration of the data communication apparatus shown in FIG. 1.

FIG. 2 is a block diagram illustrating a configuration of the data communication apparatus 1 shown in FIG. 1. The data communication apparatus 1, as shown in FIG. 2, preferably includes a CPU 11, a main memory 12, a memory controller hub (MCH) 13, an I/O controller hub (ICH) 14, a display unit 151, a graphic controller 152, a storage unit 153, a peripheral device 154, a user input unit 16 and a communication unit 17.

The CPU 11 is a component, such as a microprocessor, which controls an overall operation of the data communication apparatus 1 and executes a computer program loaded in the main memory 12. The main memory 12 temporarily stores data about performing operations of the CPU 11 including a computer program executed by the CPU 11. The main memory 12 is typically a volatile memory and may be realized as a double data rate synchronous dynamic random access memory (DDR SDRAM).

The graphic controller 152 processes a graphic data, and the display unit 151 displays an image on the basis of a graphic data processed by the graphic controller 152. The display unit 151 may be provided as an LCD, an OLED, or any etc., or any type of thin film technology display. The storage unit 153 is preferably a nonvolatile memory which stores a data and may be realized as an HDD, CD-ROM, DVD-ROM, optical device, etc. The peripheral device 154 may include, for example, a USB drive, a modem, a network card (Ethernet), a sound card, a speaker, a microphone, or the like.

With continued reference to FIG. 2, the MCH 13 interfaces a component, such as the CPU 11 or the like, with the main memory 12 to read and write a data. The ICH 14 interfaces the CPU 11 with the peripheral device 154 to communicate.

In the present exemplary embodiment, the CPU 11, which executes a computer program, is an illustrative example of a controller.

In the following explanation of the controller according to the present exemplary embodiment, reference numerals may be omitted for convenience. A computer program in the present exemplary embodiment may include BIOS, an operating system and an application program. In the present exemplary embodiment, the BIOS may be stored in a BIOS ROM (not shown) that is a nonvolatile memory, and the operating system and application may be stored, for example, in the storage unit 153 such as an HDD.

The user input unit 16 may include, for example, a keyboard, a mouse, a tablet, a touch screen, etc.

The communication unit 17 sends and receives data to and from the external data communication apparatus 2 according to control of the controller. In the present exemplary embodiment, the communication unit 17 may send and receive data by two modes. The two modes of the communication unit 17 transmitting and sending data are a network mode and a broadcast mode.

Figure 3:
FIG. 3 illustrates a data transmitting/receiving mode of a communication unit according to the exemplary embodiment of the present invention.
Figure 3:
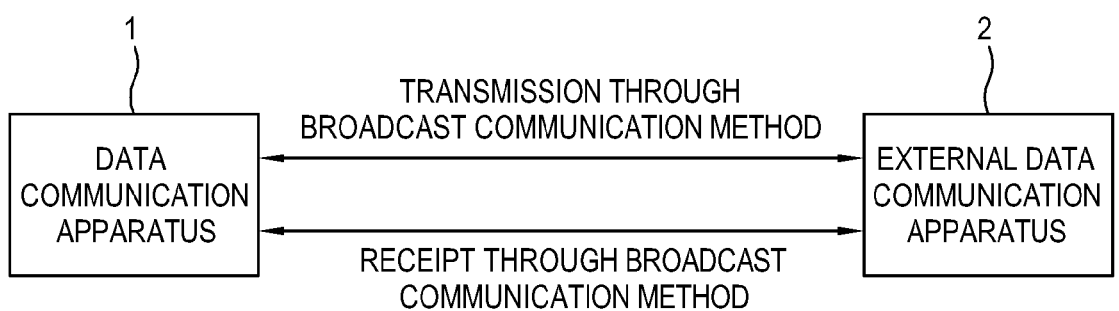

FIG. 3 illustrates a data transmitting/receiving mode of the communication unit 17 according to the exemplary embodiment of the present invention.

First, in the network mode, the communication unit 17 sends and receives data to and from the external data communication apparatus 2 by a network communication method. The network communication method by which the communication unit 17 of the present exemplary embodiment operates includes wireless network communication, for example, Bluetooth, wireless LAN, etc. The communication unit 17 may include hardware such as a Bluetooth adaptor in order to carry out communication in a corresponding mode such as Bluetooth. Further, the communication unit 17 may also include software for interface with an operating system of the data communication apparatus 1, i.e., a device driver. Alternatively, a device driver may be included in an operating system of a computer system 1.

Second, in the broadcast mode, the communication unit 17 transmits data to the external data communication apparatus 2 or receives data from the external data communication apparatus 2 by a broadcast method. In the case of transmitting data by the broadcast method, the communication unit 17 sends information indicating that the data is transmitted by the broadcast method along with a signal being transmitted. In the case of receiving data by the broadcast method, the communication unit 17 recognizes the data is transmitted by the broadcast method on the basis of information loaded in a received signal. The information indicating that the data is transmitted by the broadcast method is an illustrative example of mode information.

In the present exemplary embodiment, Bluetooth protocol is used to realize the predetermined broadcast data transmission/reception method. A broadcast packet of the present exemplary embodiment preferably comprises a packet in a complete form including data to be transmitted and is formed of an access code, a header and a payload. The broadcast data transmission/reception of the present exemplary embodiment is carried out by the same method as Bluetooth inquiry. A lower address part (LAP) used for the access code is available by defining a specific value among reserved addresses used for the inquiry, e.g., 0x9E8B33. Here, the LAP refers to a lower 24 bits of BD_ADDR which means a hardware address. Meanwhile, an LT_ADDR value of the header is set to 0, thereby showing that a data is transmitted by the broadcast method. In the present exemplary embodiment, the broadcast data transmission/reception is performed using the Bluetooth protocol. However, the broadcast data transmission/reception is not limited to the above mode, but may be conducted by various methods other than Bluetooth.

Figure 4:
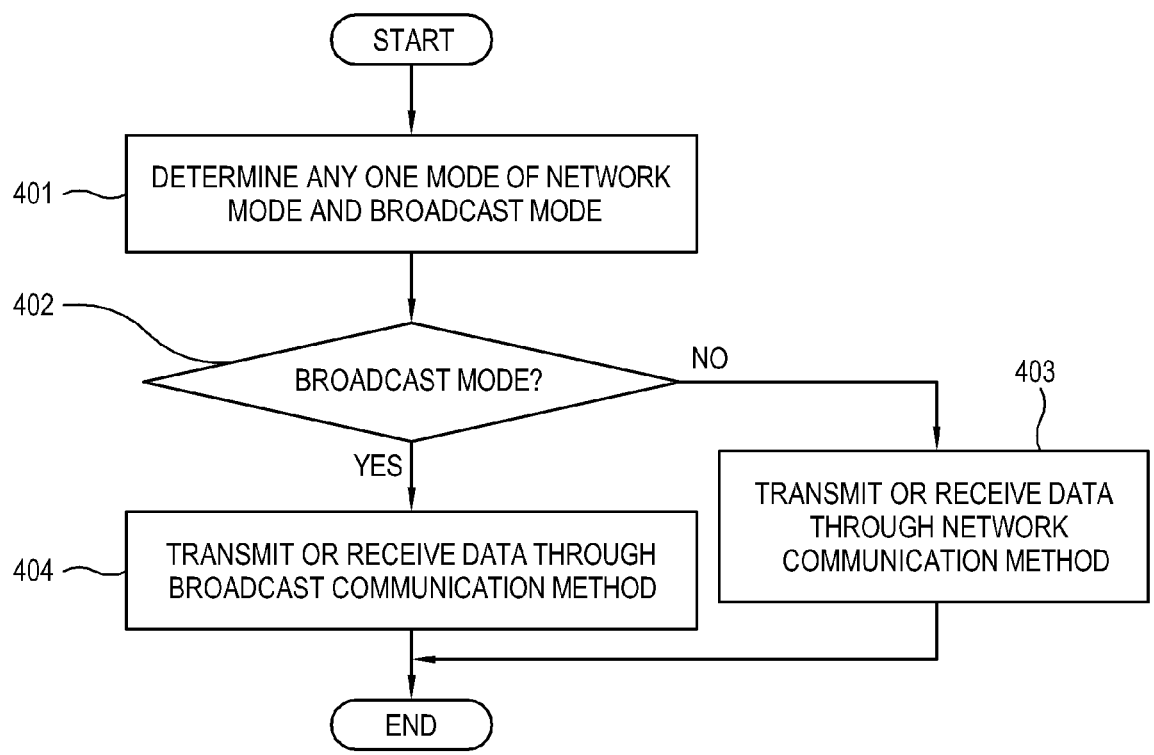
FIG. 4 is a flow chart illustrating an exemplary operation of the data communication apparatus according to the exemplary embodiment of the present invention.

FIG. 4 is a flow chart illustrating an operation of the data communication apparatus 1 according to the exemplary embodiment of the present invention. At step (401), the data communication apparatus 1 determines any one of the network mode and the broadcast mode. At step (401) in FIG. 4, the determination of a data transmitting/receiving mode may be realized by a user. For example, the user may choose through the user input unit 16 whether to transmit or receive data between in the network mode and in the broadcast mode. In this case, the controller of the data communication apparatus 1 displays a selection menu on the display unit 151 to allow the user to select one of the network mode and the broadcast mode.

As a result of step (401) in FIG. 4, if the broadcast mode is not selected, i.e., the network mode is determined (No at step (402), then at step (403) the data communication apparatus 1 transmits or receives a data in the network communication method. If the network mode is determined at the steps 402 and 403, the controller of the data communication apparatus 1 controls the communication unit 17 to transmit or receive a data in the network communication method. Alternatively, the controller of the data communication apparatus 1 may display a status on display unit 151 of a mode being operated from among the network mode and the broadcast mode.

Figure 5:
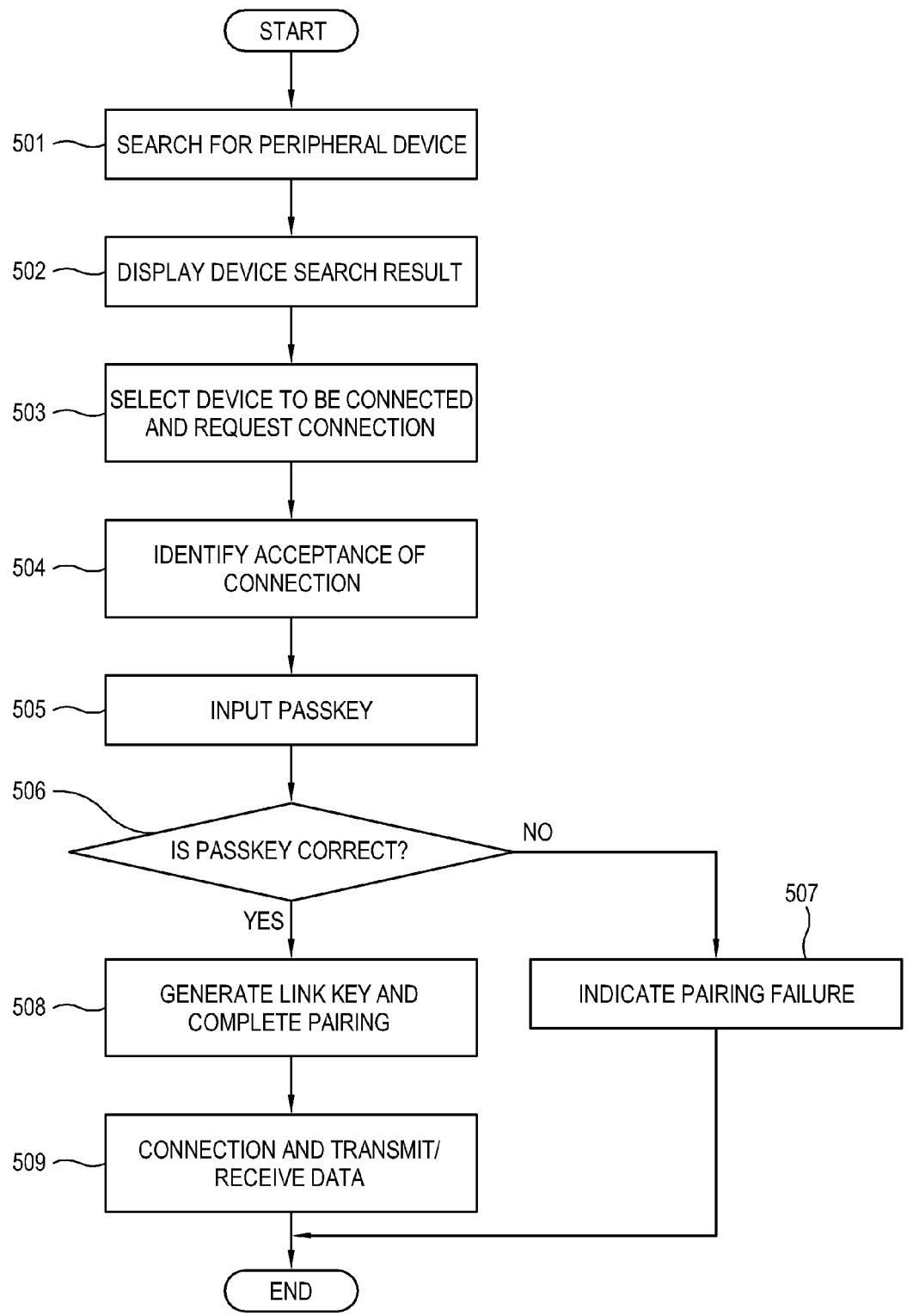
FIG. 5 is a flow chart illustrating exemplary operation of the data communication apparatus according to the exemplary embodiment of the present invention operating in a network mode.

FIG. 5 is a flow chart illustrating the data communication apparatus 1 according to the exemplary embodiment when operating in a network mode. The present embodiment is illustrated in the case of Bluetooth. Referring to FIG. 5, at step (501) the communication unit searches for a peripheral device of the data communication apparatus 1. At step (502), the controller of the data communication apparatus 1 displays a device search result of the communication unit 17 on the display unit 151. The controller of the data communication apparatus 1 enables a user to select the external data communication apparatus 2 to be connected through the user input unit 16 and at step (503) controls the communication unit 17 to request connection to the selected data communication apparatus 2. If identifying acceptance of the connection to the external data communication apparatus 2 (step (504)), the controller of the data communication apparatus 1 at step (505) allows the user to input a passkey through the user input unit 16. If the passkey is not correct ("No" at step 506), then at step (507) the controller of the data communication apparatus 1 indicates failure of pairing through the display unit 151. If the passkey is correct ("Yes" at step 506), then at step (508) the controller of the data communication apparatus 1 generates a link key and completes pairing.

Then at step (509), the data communication apparatus 1 is connected with the external data communication apparatus 2 to transmit or receive desired data.

Referring now back to FIG. 4, as a result of step (401) in FIG. 4, if the broadcast mode is determined ("Yes" at step 402), then at step (404) the data communication apparatus 1 transmits or receives a data in the broadcast method. If the broadcast mode is determined at the steps (402) and (404), the controller of the data communication apparatus 1 controls the communication unit 17 to transmit or receive a data in the broadcast method. At step (404), a data transmitted may be a file selected by a user. In this case, the controller of the data communication apparatus 1 may display a menu on the display unit 151 and enables the user to select a file to be selected.

It is within the spirit and scope of the present invention that the determination as whether to use the network mode or broadcast mode could be a default based on the type or size of data to be transmitted, so that, for example, data up to a predetermined size may be transmitted by, for example, broadcast mode. In addition, whether multiple communication devices are to receive the data could also be a basis for the particular mode selected.

Figure 6:
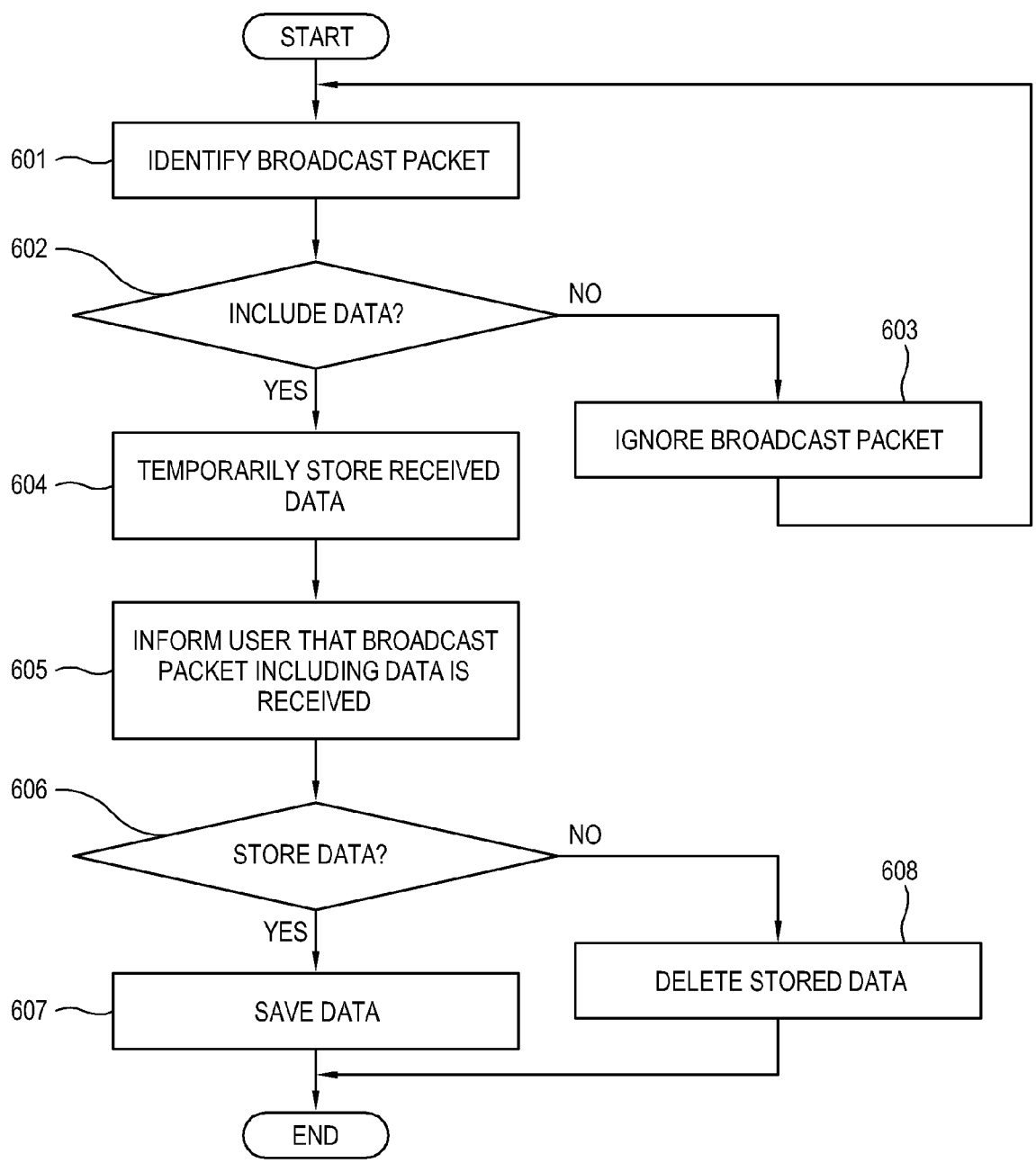
FIG. 6 is a flow chart illustrating exemplary operation of the data communication apparatus according to the exemplary embodiment of the present invention when performing receiving in a broadcast mode.

FIG. 6 is a flow chart illustrating the data communication apparatus 1 according to the exemplary embodiment performing receiving data in a broadcast mode.

Referring now to FIG. 6, at step (601) the communication unit 17 analyzes a broadcast packet received to identify whether it includes a data. If the received broadcast packet is identified not to include a data ("No" at 602), then at step (603) the communication unit 17 ignores the broadcast packet and goes back to step (601).

Meanwhile, with continued reference to FIG. 6, if the received broadcast packet is identified to include a data ("Yes" at 602), then at step (604) the received data is temporarily stored in a memory. Next at step (605), the controller of the data communication apparatus 1 informs a user that the broadcast packet including the data is received through the display unit 151. The display unit 151 is an illustrative example of a notification part in the present exemplary embodiment.

The controller of the data communication apparatus 1 allows the user at step (606) to select whether or not to store the received data through the user input unit 16. At step (606), the controller of the data communication apparatus 1 may display a related selection menu on the display unit 151.

Figure 7:
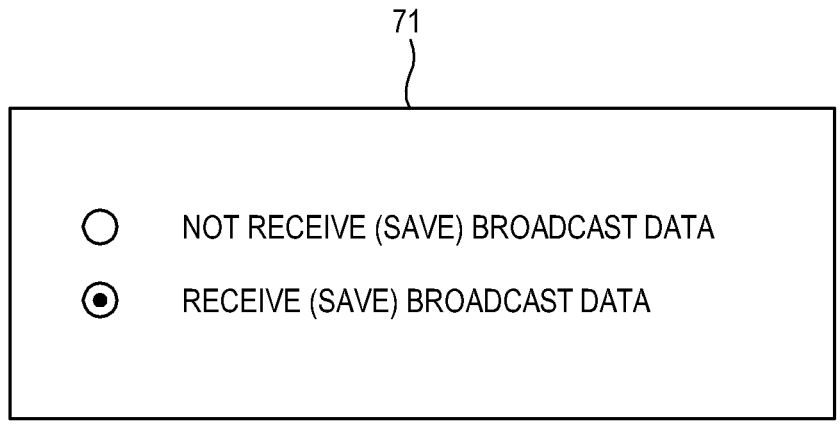
FIG. 7 illustrates a selection menu displayed by the data communication apparatus according to the exemplary embodiment of the present invention.

FIG. 7 illustrates an illustrative example of the selection menu 71. Going back to FIG. 6, if the data is not stored according to selection of the user, then at step (608) the data temporarily stored is deleted. If the data is stored according to selection of the user, at step (607) the data temporarily stored is saved.

As described above, the exemplary embodiment of the present invention improves user's convenience, transmits a data efficiently, and minimizes a possible leak of information to unauthorized users. An advantage is that a relatively small amount of information, or information that must be provided to several apparatuses can be provided by the broadcast method, whereas individual communication, or communication which may have relative larger amounts of data or particularly secure data can be exchanged via network mode having the initial connection procedure.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A data communication apparatus comprising:
a communication unit conducting data transmission/reception with an external data communication apparatus; and
a controller controlling the communication unit to operate in one of a network mode and a broadcast mode,
wherein the network mode conducts network communication via connection through an initial connection procedure between the external data communication apparatus and the data communication apparatus, in which said initial connection procedure includes a search, selection and acceptance of a communication session prior to the transmission or reception of data, and
wherein the broadcast mode transmits data to the external data communication apparatus or receives data from the external data communication apparatus according to a predetermined broadcast method without said initial connection procedure between the external data communication apparatus and the data communication apparatus.

2. The data communication apparatus according to claim 1, further comprising an input unit receiving input including a selected mode for communication, wherein the controller controls the communication unit to operate in the one of the network mode and the broadcast mode as determined by the selection received from the input unit.

3. The data communication apparatus according to claim 1, wherein the communication unit transmits mode information to the external data communication apparatus indicating whether a current mode of operation comprises the network mode or the broadcast mode.

4. The data communication apparatus according to claim 1, wherein the communication unit operates in said one of the network mode and the broadcast mode as determined according to mode information transmitted from the external data communication apparatus.

5. The data communication apparatus according to claim 4, further comprising a notification part, wherein the controller controls the notification part to inform a user that data is being transmitted from the external data communication apparatus in the broadcast mode.

6. The data communication apparatus according to claim 1, further comprising an input unit receiving user input information that is user selected, wherein the controller controls the communication unit to transmit a file in the broadcast mode to the external data communication apparatus according to the user input.

7. The data communication apparatus according to claim 1, further comprising a display unit, wherein the controller displays on the display unit a status indicating whether the network mode or the broadcast mode is a current mode of operation.

8. The data communication apparatus according to claim 1, wherein the broadcast method comprises Bluetooth.

9. The data communication apparatus according to claim 1, wherein the broadcast method comprises wireless LAN.

10. A data communication apparatus comprising:
a communication unit conducting data transmission/reception with an external data communication apparatus; and
a controller controlling the communication unit to operate in one of a network mode and a broadcast mode,
wherein the network mode conducts network communication via connection through an initial connection procedure with the external data communication apparatus,
wherein the broadcast mode transmits data to the external data communication apparatus or receives data from the external data communication apparatus according to a predetermined broadcast method, and
wherein the controller controls the communication unit to operate in one of the network mode and the broadcast mode according to a type of data to be transmitted.

11. A data communication apparatus comprising:
a communication unit conducting data transmission/reception with an external data communication apparatus; and
a controller controlling the communication unit to operate in one of a network mode and a broadcast mode,
wherein the network mode conducts network communication via connection through an initial connection procedure with the external data communication apparatus, and
wherein the broadcast mode transmits data to the external data communication apparatus or receives data from the external data communication apparatus according to a predetermined broadcast method, and
wherein the controller controls the communication unit to operate in one of the network mode and the broadcast mode according to a number of external communication devices that are to be transmitted a same data.

12. A data communication method of a data communication apparatus comprising:
determining by a controller a selection of one of a network mode and a broadcast mode for communication; and
conducting by a communication unit network communication via connection through an initial connection procedure with an external data communication apparatus when the network mode is determined, in which said initial connection procedure includes a search, selection and acceptance of a communication session between the data communication apparatus and the external data communication apparatus prior to a transmission or reception of data, and transmitting or receiving a data to or from the external data communication apparatus in a broadcast method when the broadcast mode is determined,
wherein the controller controls the communication unit to operate in one of the network mode and the broadcast mode according to a type of data to be transmitted.

13. The data communication method according to claim 12, further comprising receiving input from a user, wherein the determining comprises determining the one of the network mode and the broadcast mode according to the input from the user.

14. The data communication method according to claim 12, wherein the transmitting the data comprises transmitting mode information to the external data communication apparatus indicating which of the network mode and the broadcast mode is being used for communication.

15. The data communication method according to claim 12, wherein the determining selection of one of the network mode and broadcast mode is based on mode information transmitted from the external data communication apparatus.

16. The data communication method according to claim 15, further comprising informing a user that a data is being transmitted from the external data communication apparatus in the broadcast mode.

17. The data communication method according to claim 12, further comprising:
  receiving input from a user; and
  selecting a file to be transmitted in the broadcast mode according to the input from the user,
  wherein the transmitting of the data comprises transmitting the selected file.

18. The data communication method according to claim 12, further comprising displaying on a display unit a status indicating which of the network mode and the broadcast mode has been selected for communication.

19. The data communication method according to claim 12, wherein the broadcast method comprises Bluetooth.

20. A data communication method of a data communication apparatus comprising:
  determining a selection of one of a network mode and a broadcast mode for communication; and
  conducting network communication via connection through an initial connection procedure with an external data communication apparatus when the network mode is determined, and transmitting data to the external data communication apparatus or receiving data from the external data communication apparatus in a broadcast method when the broadcast mode is determined, wherein the selection of one of the network mode and the broadcast mode is based on at least one of a size of the data to be transmitted and a number of external communication devices that are to be transmitted a same data.

* * * * *